Dec. 22, 1936.　　　　J. W. ADERHOLZ　　　　2,065,415

PORTABLE BED FOR VEHICLES

Filed Sept. 17, 1935　　　3 Sheets-Sheet 2

Inventor
J. W. ADERHOLZ.

By

Attorney

Dec. 22, 1936.  J. W. ADERHOLZ  2,065,415
PORTABLE BED FOR VEHICLES
Filed Sept. 17, 1935  3 Sheets-Sheet 3
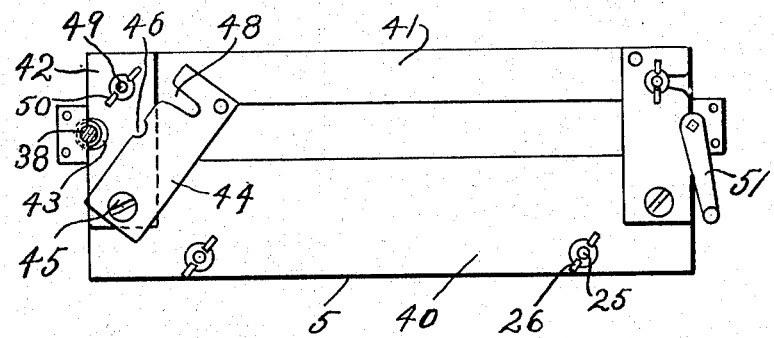
Fig. 4.
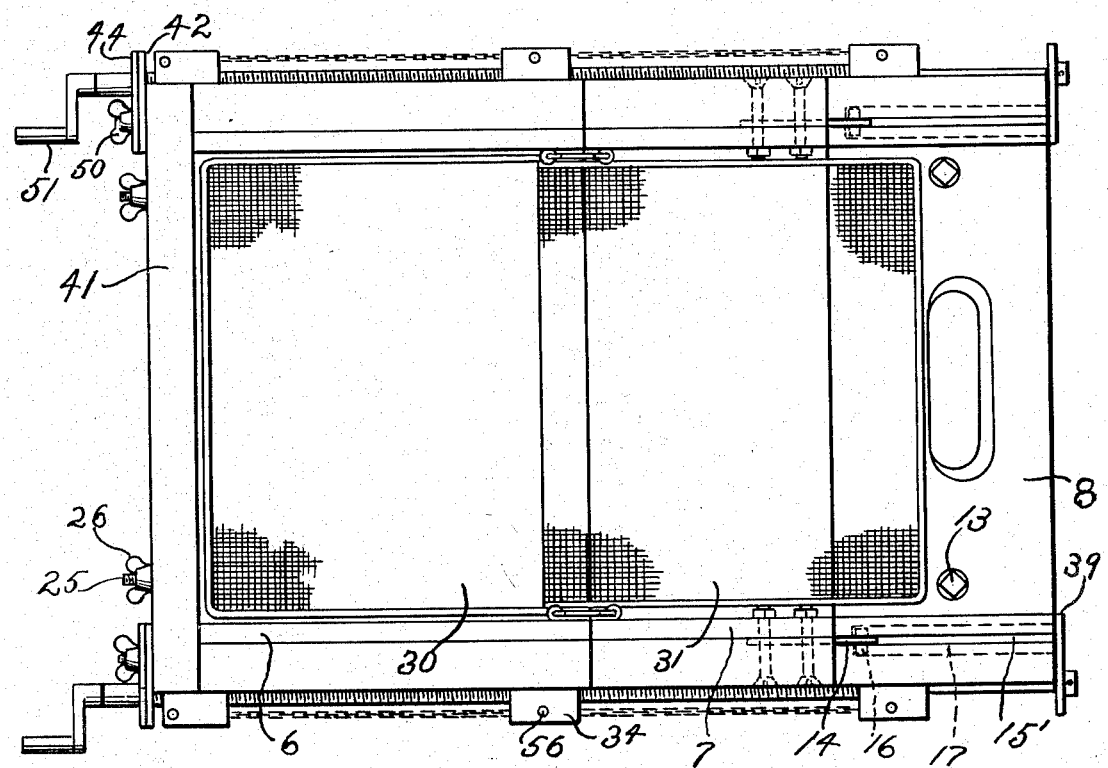
Fig. 5.
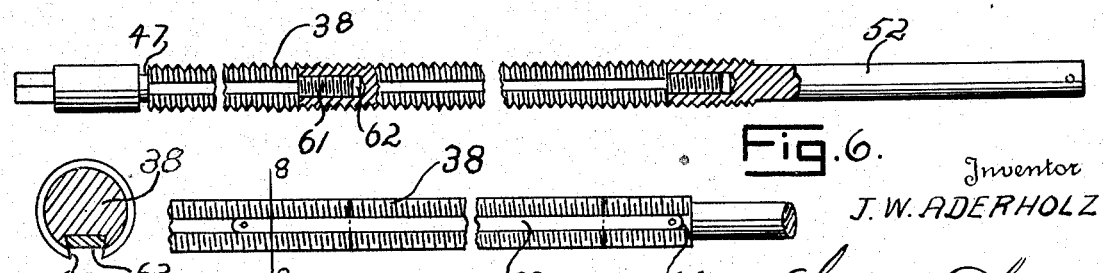
Fig. 6.
Fig. 8.  Fig. 7.
Inventor
J. W. ADERHOLZ.
By Horace C. Chandler
Attorney Patented Dec. 22, 1936

2,065,415

UNITED STATES PATENT OFFICE 2,065,415

PORTABLE BED FOR VEHICLES

Joseph W. Aderholz, Houston, Tex.

Application September 17, 1935, Serial No. 40,989

3 Claims. (Cl. 5—119)

My invention relates to improvements in portable beds for use in conjunction with vehicles such as automobiles.

It is an object of the invention to provide a portable bed attached to the rear end of the vehicle, which when desired to be used can be readily extended and when not in use can be collapsed to occupy a minimum amount of space.

A further object is to provide a canopy associated with the portable bed which when extended will completely cover the bed and which serves as a cover for the folded bed structure when collapsed.

Another object of the invention is to provide a device of the above-mentioned character which is simple and durable in construction, reliable and efficient in use, and inexpensive to manufacture.

Other objects and advantages of the invention will be apparent during the course of the following description.

Figure 1:
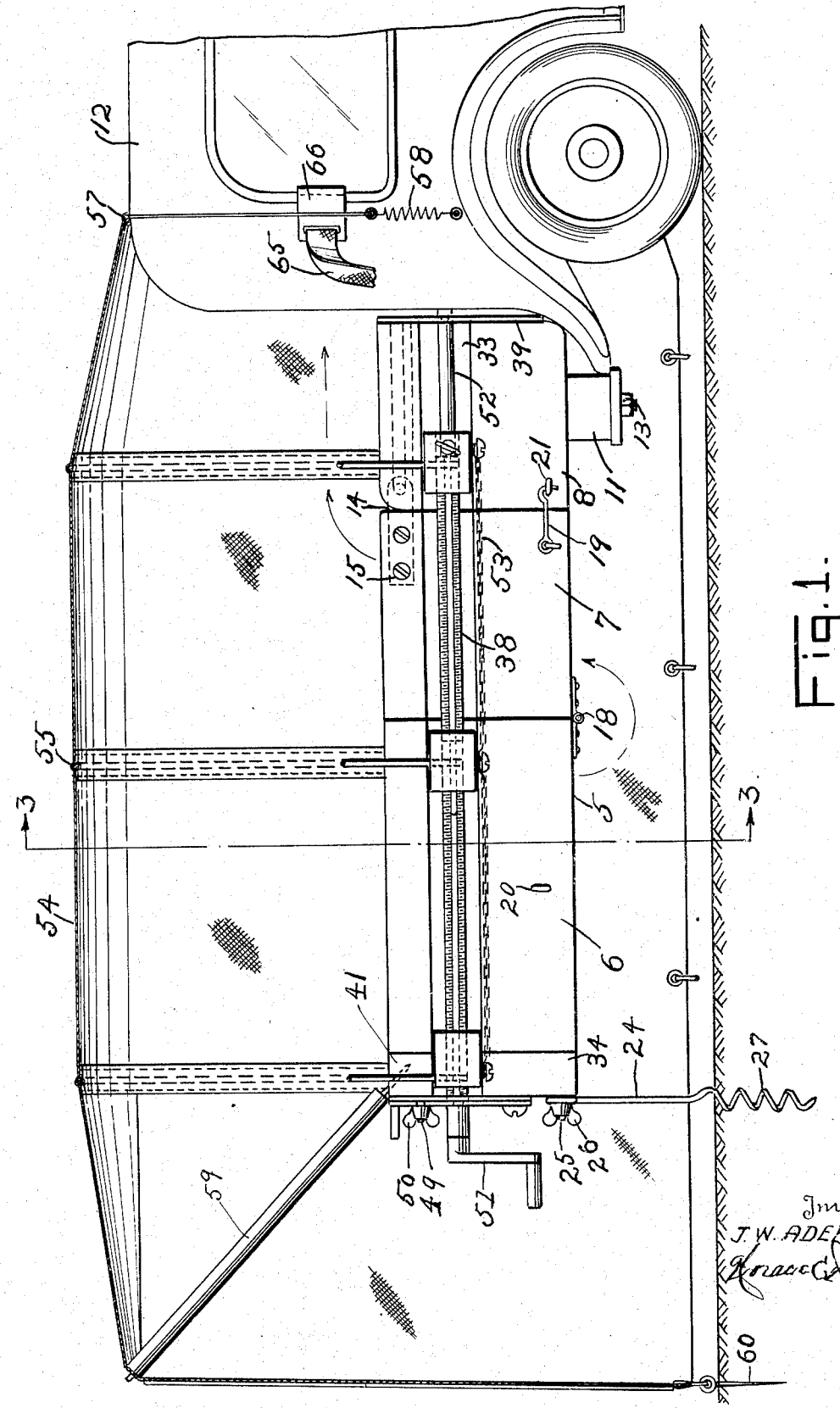
Figure 2:
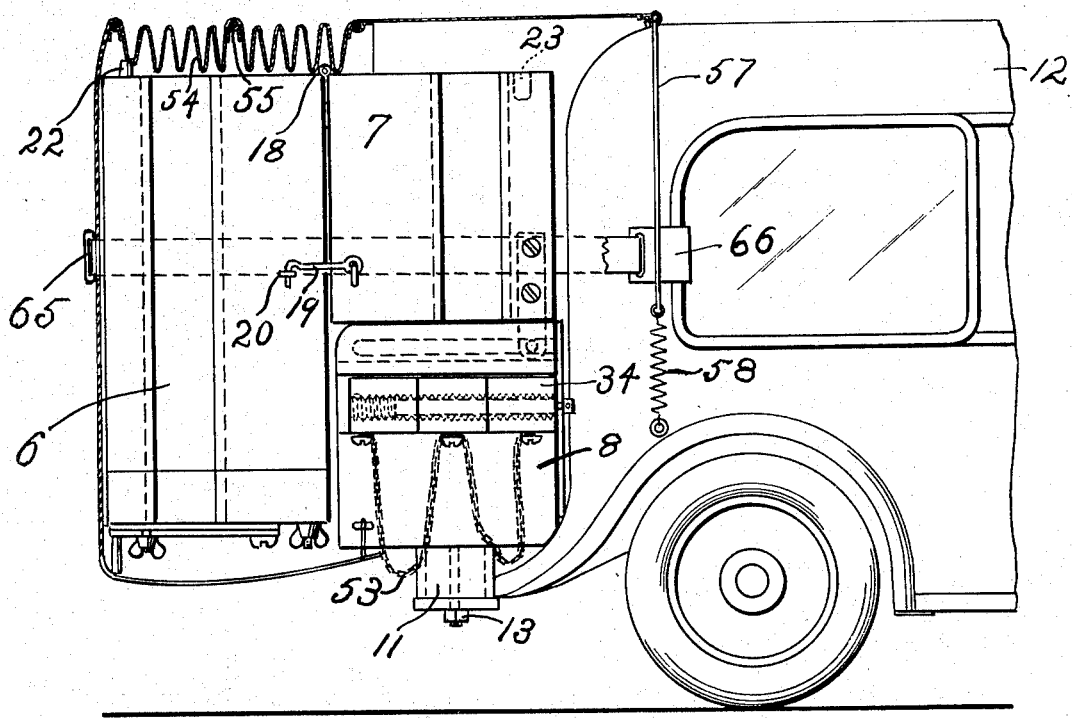
Figure 3:
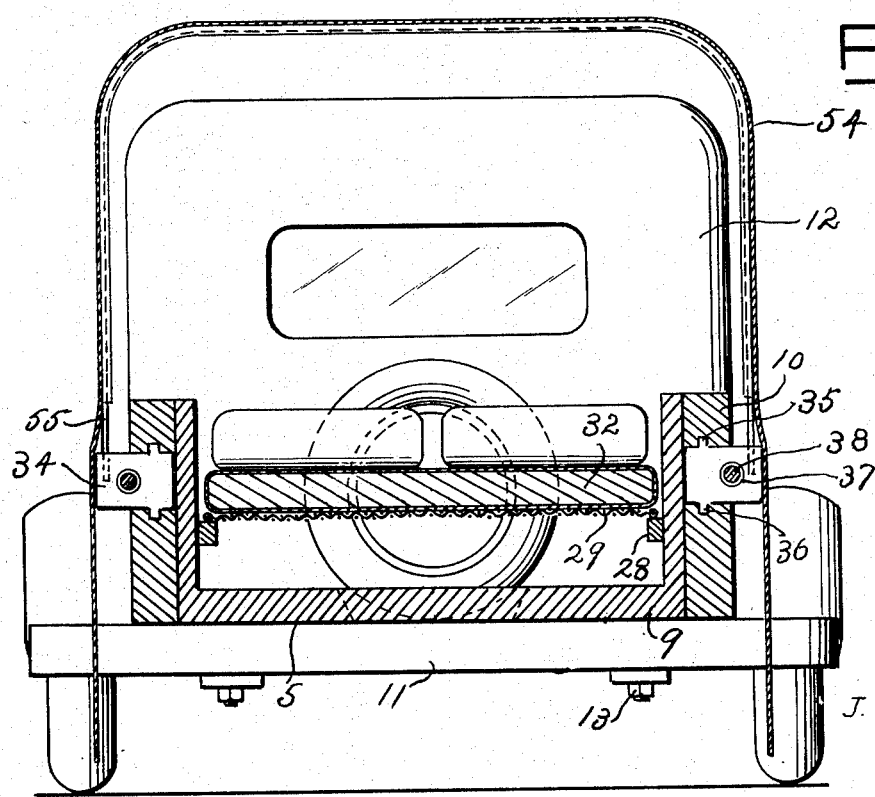

In the accompanying drawings, forming a part of this specification and in which like numerals are employed to designate like parts throughout the same, Figure 1 is a side elevation of the bed in extended position, Figure 2 is a side elevation of the bed in folded or collapsed position, the canopy being shown in section, Figure 3 is a transverse section taken on the lines 3—3 of Figure 1, Figure 4 is an end view of the bed structure, Figure 5 is a top plan view of the bed structure, Figure 6 is a view of one of the canopy adjusting rods, partly in section, Figure 7 is a detail view of another side of the adjusting rod, showing the locking bar for securing the sections of the rod together, and Figure 8 is a cross section taken on the line 8—8 of Figure 7.

In the drawings, wherein for the purpose of illustration, I have shown a preferred embodiment of my invention, the numeral 5 denotes generally the bed supporting structure composed of three sections 6, 7, and 8, the section 6 being equal in length to the combined length of the other two sections. The sections each have a bottom wall 9 and side walls 10 and the section 8 is fixedly mounted on top of the rear bumper bar 11 of the automobile 12, by bolts 13. The section 7 at one end is hingedly connected to the section 8 by hinge plates 14 fixedly secured in the ends of the side walls 10 of the section 7, adjacent their upper edges, by screws 15. The plates 14 extend beyond the end of the section 7 and engage in a slot 15' extending along the top of the side walls of section 8, their free ends having laterally projecting pivot pins 16 which engage in longitudinal grooves 17 formed in the side walls of the slot 15', whereby the section 7 is pivotally and slidably connected with section 8, to permit the section 7 to swing upwardly and slide backwardly into superposed relation with respect to section 8. The opposite end of section 7 is hingedly connected to one end of section 6 by strap hinges 18 secured to the bottoms of the sections, which permits the section 6 to swing downwardly when the section 7 is swung upwardly, whereby the sections assume the position shown in Figure 2. When in folded relation the section 6 is secured against movement by hooks 19 attached to the outer sides of section 7 which engage eyes 20 attached to the sides of section 6. When the sections are extended, as shown in Figure 1, the hooks 19 engage eyes 21 attached to the sides of section 8. The ends of the side walls of section 6 have dowel pins 22 extending therefrom adapted to engage in recesses 23 in the ends of the side walls of section 7, and detachably attached to the opposite end of section 6 are depending ground supporting rods 24, secured on bolts 25 by wing nuts 26. The lower ends 27 of the rods 24 are corkscrew in shape to secure the rods in the ground.

The side walls 10 of each of the sections have longitudinal side rails 28 attached to the inside thereof, for supporting a bed spring 29 composed of telescoping sections 30 and 31, and a suitable mattress 32 is supported by the bed spring.

The outside of the side walls 10 of the sections are provided with longitudinal grooves in which are slidably mounted a plurality of blocks 34 which are retained in the grooves and guided in their movement by ribs 35 projecting from their sides which engage channel 36 formed in the sides of the grooves. Each of the blocks 34 has a longitudinally extending threaded opening 37, through which extends a screw shaft 38, the inner end of which is journaled in bracket plates 39 attached to and projecting laterally from the ends of section 8. The outer end of section 6 has an end wall 40 and disposed above the end wall is a cross bar 41 connected at each end to the end wall by vertical plates 42 provided at their edges with notches 43 for receiving the outer end of the shaft 38. A locking plate 44 for securing the shaft 38 against longitudinal movement is pivotally mounted, at one end, to the plate 42 by a pivot bolt 45, the edge of the locking plate having a notch 46 which engages with the annular groove 47 of the shaft and a slot 48 in the edge of the locking plate above the notch 46 engages a bolt 49 attached to the plate 42 on which is threaded a wing nut 50 for clamping the locking plate 44 in locking engagement with the shaft 38. A crank handle 51 is attached to the outer end of the shafts 38 for turning the shafts which cause the blocks 34 to move longitudinally of the bed supporting structure. The inner ends 52 of the shafts 38 are free of threads for a distance equal to a width of two of the blocks 34 and the blocks are interconnected by a length of chain 53.

A canopy or tent 54 is supported over the bed structure by a plurality of U-shaped bows 55 extending across the bed structure with their ends fitted in sockets 56 in opposed blocks 34. The inner end of the canopy 54 extends over the top of the automobile, being secured in tight engagement therewith by a flexible cable 57, the ends of the cable being attached to the sides of the automobile body by tension springs 58. The outer end of the canopy is supported in extended position beyond the end of the bed structure, by inclined brace rods 59 removably secured in the top of the cross bar 41. The sides and outer end of the canopy extend down into close proximity with the ground and are secured at spaced intervals to suitable ground pegs 60, one side of the canopy being provided with a suitable flap, not shown, through which a person may enter the canopy.

As more clearly shown in Figures 6, 7, and 8, the screw shafts 38 are formed in sections, detachably connected together, by means of a threaded tenon 61 extending from one end of a section which engages a threaded recess 62 formed in the abutting end of the next adjacent section. To secure the sections of the shaft together, a locking bar 63 is slidably fitted in a dovetail groove 64 formed in one side of the threaded portion of the shaft.

When the device is collapsed as shown in Figure 2, a strap 65 is passed around the ends and sides, the ends of the strap being fastened to suitable brackets 66 attached to the sides of the automobile body.

When it is desired to use the bed, the strap 65 is first removed, and the sections of the bed supporting structure 5 extended to the position shown in Figure 1. After the bed structure is extended, the shafts 38 are assembled, and then threaded through the openings 37 of the blocks 34, which are initially disposed in the groove 33 of the section 8. The inner ends of the shafts 38 are journaled in the bracket plates 39, while the outer ends of the shafts are locked in position by the locking plates 44. It will be observed that when the shafts 38 are fitted in operative position the two innermost blocks 34 will be disposed on the unthreaded portion 52 of the shafts, while the outer block will be engaged with the threaded portion. As the crank 51 is turned the shaft 38 is rotated to cause the foremost block 34 to move forwardly, the next adjacent block remaining stationary until the slack in the chain 53, connecting the two blocks, is taken up, whereupon the next block is drawn into engagement with the threaded portion of the shaft and moved forwardly simultaneously with the foremost block. When the blocks have been properly positioned along the sides of the bed structure, the ends of the bows 55 are disposed in the sockets 56 of the blocks to support the canopy 54 over the bed structure. The forward end of the canopy is attached to the automobile body by the cable 57 and the outer end is supported in extended position by the removable brace rods 59. To collapse the device, the steps for erecting the same are reversed and when collapsed, as shown in Figure 2, the device will be supported wholly by the rear bumper of the automobile and occupy a minimum of space.

It is to be understood that the form of my invention herewith shown and described is to be taken as a preferred example of the same and that certain changes in the shape, size, and arrangement of the parts may be made without departing from the spirit of the invention or scope of the subjoined claims.

What is claimed is:

1. In a device of the class described, a folding bed and tent comprising a bed frame composed of a plurality of sections hingedly connected together, the innermost section being fixedly mounted on the rear end of an automobile, a plurality of blocks slidably mounted in the sides of said bed frame for longitudinal movement thereof, a series of transverse bows supported by said blocks, a canopy extending over and supported by said bows, and screw shafts extending through said blocks and having threaded engagement therewith for moving said blocks longitudinally of said bed frame.

2. In a device of the class described, a folding bed and tent comprising a bed frame composed of a plurality of folding sections, the innermost section being fixedly mounted on the rear end of an automobile; means hingedly and slidably connecting the intermediate section to the innermost section to permit the intermediate section to be swung upwardly over the innermost section, means hingedly connecting the outermost section to the intermediate section to permit the outermost section to swing downwardly when the intermediate section swings upwardly, and means carried by said frame and movable longitudinally thereof for supporting a canopy.

3. In a device of the class described, a folding bed and tent comprising a bed frame composed of a plurality of folding sections, the innermost section being fixedly mounted on the rear end of an automobile, means hingedly and slidably connecting the intermediate section to the innermost section to permit the intermediate section to swing upwardly and move over the innermost section, means hingedly connecting the outermost section to the intermediate section to permit the outermost section to swing downwardly when the intermediate section swings upwardly, a plurality of blocks slidably mounted in the sides of said bed frame, bows extending transversely of said bed frame and supported by said blocks, a canopy extending over and supported by said blocks, and a screw shaft extending through and having threaded engagement with said blocks for adjusting said blocks longitudinally of said bed frame.

JOSEPH W. ADERHOLZ.